US 9,682,759 B1

(12) United States Patent
Huntley

(10) Patent No.: US 9,682,759 B1
(45) Date of Patent: Jun. 20, 2017

(54) TROLLING MOTOR LIFT CORD CLAMP DEVICE

(71) Applicant: T-H Marine Supplies, Inc., Huntsville, AL (US)

(72) Inventor: Jeffery William Huntley, Madison, AL (US)

(73) Assignee: T-H Marine Supplies, Inc., Huntsville, AL (US)

( * ) Notice: Subject to any disclaimer, the term of this patent is extended or adjusted under 35 U.S.C. 154(b) by 0 days.

(21) Appl. No.: 15/074,459

(22) Filed: Mar. 18, 2016

(51) Int. Cl.
*F16B 47/00* (2006.01)
*B63H 20/10* (2006.01)
*B63H 20/00* (2006.01)
*F16B 2/06* (2006.01)
*F16M 13/02* (2006.01)
*F16B 2/00* (2006.01)

(52) U.S. Cl.
CPC ........... *B63H 20/10* (2013.01); *B63H 20/007* (2013.01); *F16B 2/005* (2013.01); *F16B 2/06* (2013.01); *F16M 13/022* (2013.01)

(58) Field of Classification Search
CPC ....... B63H 20/10; B63H 20/007; F16B 2/005; F16B 2/06; F16M 13/022
USPC ........... 248/640, 642, 643, 644, 74.1, 229.2, 248/229.25; 440/6, 62, 63, 65, 24
See application file for complete search history.

(56) References Cited

U.S. PATENT DOCUMENTS

| 1,025,243 | A | * | 5/1912 | Carpenter | F16L 3/14 248/58 |
| 1,063,852 | A | * | 6/1913 | Carpenter | F16L 3/10 248/74.4 |
| 2,539,783 | A | * | 1/1951 | Kirk, Jr. | F16L 3/11 248/62 |
| 3,329,455 | A | * | 7/1967 | Becker | F16C 1/14 403/104 |
| 3,724,790 | A | * | 4/1973 | Harris | B63H 20/007 248/642 |
| 3,851,979 | A | * | 12/1974 | Becker | F16L 3/14 248/62 |
| 3,954,080 | A | * | 5/1976 | Weaver | B63H 20/007 248/642 |
| 5,606,262 | A | * | 2/1997 | Montalbano | B25J 9/041 324/750.22 |
| 5,742,982 | A | * | 4/1998 | Dodd | F16G 11/00 24/16 R |

(Continued)

*Primary Examiner* — Muhammad Ijaz
(74) *Attorney, Agent, or Firm* — Stephen H. Hall; Bradley Arant Boult Cummings LLP

(57) ABSTRACT

Included is a trolling motor lift cord attachment device for attaching a trolling motor lift cable, or cord to a support of a trolling motor. The device comprises a clamping bracket having a first clamp section and a second clamp section. Each clamp section includes a center section, a center axis passing through the center section, at least two arm portions extending from the center section, and a concave engagement area formed by the center section and at least two arm portions. Each arm portion includes a fastening area positioned to align with one of the fastening areas on another arm portion when the center axes of the clamp sections are aligned. The concave engagement area of each clamp section is shaped to form an orifice shape to substantially surround the support of the trolling motor when the center axis of the first section is aligned with the center axis of the second section.

8 Claims, 11 Drawing Sheets

(56) References Cited

U.S. PATENT DOCUMENTS

| | | | | |
|---|---|---|---|---|
| 5,971,001 | A * | 10/1999 | Andersson | F16L 41/06 137/15.12 |
| 6,053,781 | A * | 4/2000 | Littleton | B63H 20/007 114/146 |
| 6,131,859 | A * | 10/2000 | Giuliano | F16L 3/1016 24/279 |
| 6,892,990 | B2 * | 5/2005 | Pisczak | H02G 7/053 248/62 |
| 8,020,257 | B2 * | 9/2011 | Merten | A01D 34/824 16/442 |
| 9,127,707 | B1 * | 9/2015 | Huntley | B63H 20/10 |
| 9,447,899 | B2 * | 9/2016 | Minami | B64D 37/005 |
| 2002/0102888 | A1 * | 8/2002 | Pasley | B63H 20/10 440/6 |
| 2006/0105893 | A1 * | 5/2006 | Chen | A63B 21/0004 482/126 |
| 2007/0272806 | A1 * | 11/2007 | Kim | F16L 3/1008 248/62 |

* cited by examiner

TROLLING MOTOR LIFT CORD CLAMP DEVICE

BACKGROUND

Technical Field

The present disclosure relates generally to a trolling motor, and more specifically relates to an improved trolling motor lift cord clamp device for assisting in attaching a trolling motor lift cord that is used to raise and lower a trolling motor between raised and lowered positions.

Background Art

Trolling motors are devices commonly used by fishermen to quietly and slowly propel boats over bodies of water. Trolling motors have been in use for a number of years. Trolling motors are normally positioned on the bow of a boat, using a fixed mount that allows the trolling motor to be lowered into and raised out of the water. The raising and lowering of the trolling motor has traditionally been accomplished with a lift cord device comprised of a length of rope threaded through an opening on the trolling motor frame and attached to the eyelet of the trolling motor locking mechanism on one end, and a simple handle on the other end for the user to grasp and pull. To lift the trolling motor the user must pull on the lift cord, which disengages a locking mechanism, often referred to as a lockslide pin, and then continue pulling the cord until the trolling motor fully folds into the desired position. The conventional lift cord device is made of standard rope constructed from braided or twisted natural fibers (such as cotton, hemp, etc.) or man-made fibers (such as nylon, polypropylene, polyester, etc.).

The lift cord is typically connected to the trolling motor by passing it through a hole in the locking mechanism and tying a knot to secure it. On the end of the lift cord opposite the trolling motor locking mechanism there is normally a lifting handle. The handle of the conventional lift cord is a simple oblong device constructed of a rigid plastic or wood that fits into the palm of the user's hand. The handle is typically connected to the lift cord by passing the lift cord through a hole in the handle and securing it within a cavity in the handle by tying a knot that prevents the lift cord from passing back through the hole in the handle. In this format, the cord and handle form a T-shape, with the cord passing through a user's fingers when the user grips the handle. To the present, seemingly all trolling motors have been manufactured with this standard lift cord comprised of rope and a simple handle.

One problem with the conventional trolling motor lift cord and the replacement lift cords available prior to the present disclosure is the fact that the lift cord often breaks. Because of the materials traditionally used in manufacturing trolling motor lift cords, prolonged use of the cords frequently results in cord breakage. Moreover, in the past few years trolling motors have grown in size and weight, which has put further stress on the conventional lift cord. As a result, lift cord breakage occurs even more frequently than ever before. If the cord breaks, it is very difficult for the user to lift the trolling motor out of the water. This can create a dangerous situation where the user is bending over the edge of the boat in an attempt to lift the trolling motor, which could result in the user falling into the water and drowning. This also creates a dangerous situation in that the user cannot drive the boat under the power of the main engine with the trolling motor in the down position, since this would create a damaging scenario for the trolling motor and the hull of the boat, which could cause injury or death to the user.

Another problem with the conventional trolling motor lift cord is that the attachment of the cord to the trolling motor is difficult, time consuming, and costly. Although traditional cord materials may be relatively easy to tie into a knot, confined spaces may make tying a knot to the locking mechanism difficult. Additionally, the tightly enclosed and confined spaces surrounding the trolling motor locking mechanism make the use of tools or brackets difficult, making replacement of the conventional lift cord complicated and potentially dangerous when the user is on a boat in the water.

Another problem with the conventional trolling motor lift cord is the location of the attachment of the cord to the trolling motor. Some trolling motor models do not utilize the traditional locking mechanism. These are often the larger and stronger new models used on saltwater boats, and also aluminum boats that may not have a bow portion configured to receive the traditional trolling motor housing, including the traditional locking mechanism. In this case, users may drill or pierce components of the trolling motor to secure the lift cord to the motor, such as the frame and/or the motor casing of the trolling motor itself in order to attach the cord to the trolling motor. As such attachment of the trolling motor cord requires special tools and sometimes extensive lengths of time while potentially defacing the trolling motor and sacrificing the integrity of the trolling motor structure and or frame. Alternatively, users may just manually try to pull the trolling motor out of the water by hand, which can be heavy, and potentially dangerous.

What is needed is an improved trolling motor lift cord clamp device which is lacking in the art.

BRIEF SUMMARY

In view of the foregoing disadvantages inherent in the conventional trolling motor lift cords and lift cord clamp devices now present in the art, the present disclosure provides an improved trolling motor lift cord clamp device for attaching a trolling motor lift cord to a trolling motor for movement of the trolling motor between a lowered position and a raised position.

In an embodiment, a trolling motor lift cord attachment device is disclosed. The attachment device is for attaching a trolling motor lift cord or cable to a support of a trolling motor. The device comprises a clamping bracket having a first clamp section and a second clamp section. Each clamp section includes a center section, a center axis passing through the center section, at least two arm portions extending from the center section, and a concave engagement area formed by the center section and at least two arm portions. Each arm portion includes a fastening area positioned to align with one of the fastening areas on another arm portion when the center axes of the clamp sections are aligned. The concave engagement area of each clamp section is shaped to form an orifice shape to substantially surround the support of the trolling motor when the center axis of the first section is aligned with the center axis of the second section.

In some embodiments, the device further includes a plurality of fasteners with each fastener shaped to engage one of the fastening areas on two different arm portions to secure those arm portions together. First and second base gaskets are also included. Each base gasket is shaped to removably engage and substantially follow the shape of one of the concave engagement areas. Further, each base gasket is shaped to reduce the size of the orifice formed between the concave engagement areas. The clamping bracket of the device can further include the first clamp section having a cable connection location shaped to secure the trolling motor lift cable to the clamping bracket. The second clamp section can include a stanchion connection location shaped to secure a stanchion used to support the trolling motor.

Each base gasket can include a length and a collar at both ends of the length. Each collar can be shaped to extend around at least a portion of the concave engagement area on one of the clamp sections. Each base gasket can further include at least one opening positioned along the length.

The device can further include a plurality of spacers with each spacer positioned to engage and fit against one of the base gaskets. Each spacer can be further shaped to reduce the size of the orifice formed between the concave engagement areas. Each spacer can further include at least one protrusion positioned and shaped to engage at least one opening in one of the base gaskets to smoothly secure the spacer to the base gasket. Further the plurality of spacers include a first spacer having a first thickness and a second spacer having a second thickness greater than the first thickness. The second spacer can include a plurality of friction members positioned to increase the coefficient of friction for that spacer.

Also included in some embodiments is a trolling motor lift cord kit, wherein the kit comprises of a trolling motor lift cable, a trolling motor lift handle attached to the trolling motor lift cable, and a clamping system. The clamping system can include a clamping bracket having a first clamp section and second clamp section. Each clamp section can have a center section, a center axis passing through the center section, at least two arm portions extending from the center section, and a concave engagement area formed by the center section and at least two arm portions. Each arm portion can include a fastening area position to align with one of the fastening areas on another arm portion when the center access of the clamp sections are aligned. Further the concave engagement area of each clamp section can be shaped to form an orifice where in the orifice can substantially surround the support of the trolling motor when the center axes of the clamp sections are aligned.

The first clamp section can include a cable connection location shaped to secure the trolling motor lift cable to the clamping bracket. A plurality of fasteners can be included where each fastener can be shaped to engage one of the fastening areas on two different arm portions to secure those arm portions together. First and second base gaskets can be included where each base gasket can be shaped to removeably engage and substantially follow the shape of one of the concaving engagement areas. Each base gasket can be shaped to reduce the size orifice form between the concave engagement areas. Each base gasket can include a length and a collar at both ends of the length wherein each collar is shaped to extend outside and around at least a portion of the concaving engagement area of one of the clamp sections.

The kit can further include a plurality of spacers with each spacer shaped to engage and fit against one of the base gaskets and to reduce the size of the orifice formed between the concave engagement areas. Each base gasket can further include an opening a plurality of openings positioned along the length. Each spacer can further include a plurality of protrusions positioned to align with and shaped to engage one of the openings to removeably secure the spacer to the base gasket. The plurality of spacers can include a first spacer having a first thickness and a second spacer having a second thickness greater than the first thickness. At least one of the spacers can include a plurality of friction member shaped and positioned to decrease the coefficient friction of that spacer.

It is therefore an object of the current disclosure to provide an improved trolling motor lift cord clamp device.

Still another object of the present disclosure is to provide a trolling motor lift cord clamping device that can easily attach to the support of a trolling motor.

Another object of the current disclosure is to provide a trolling motor lift cord clamping device that can readily adapt to various sizes of supports used in conjunction with a trolling motor.

Another object of the current disclosure is to provide a trolling motor lift cord clamping device that reduces the potential for rotational slippage of the trolling motor lift cord when used by user to lift the trolling motor.

Numerous other objects, features, and advantages of the present disclosure be readily apparent for those skilled in the art upon reading of the following description when taken in conjunction with accompanying drawings. To the accomplishment of the above and related objects, this disclosure maybe embodiment in the form illustrated in the accompanying drawings, recognizing however, that the drawings are illustrative only, the changes may be made in the specific instruction illustrated and described and stay within the scope of the appended claims.

BRIEF DESCRIPTION OF THE DRAWINGS

It should be noted that identical features in different drawings are shown with the same reference numeral. Various other objects, features and attendant advantages of the present disclosure will become fully appreciated as the same becomes better understood when considered in conjunction with the accompanying drawings.

DETAILED DESCRIPTION

Figure 1:
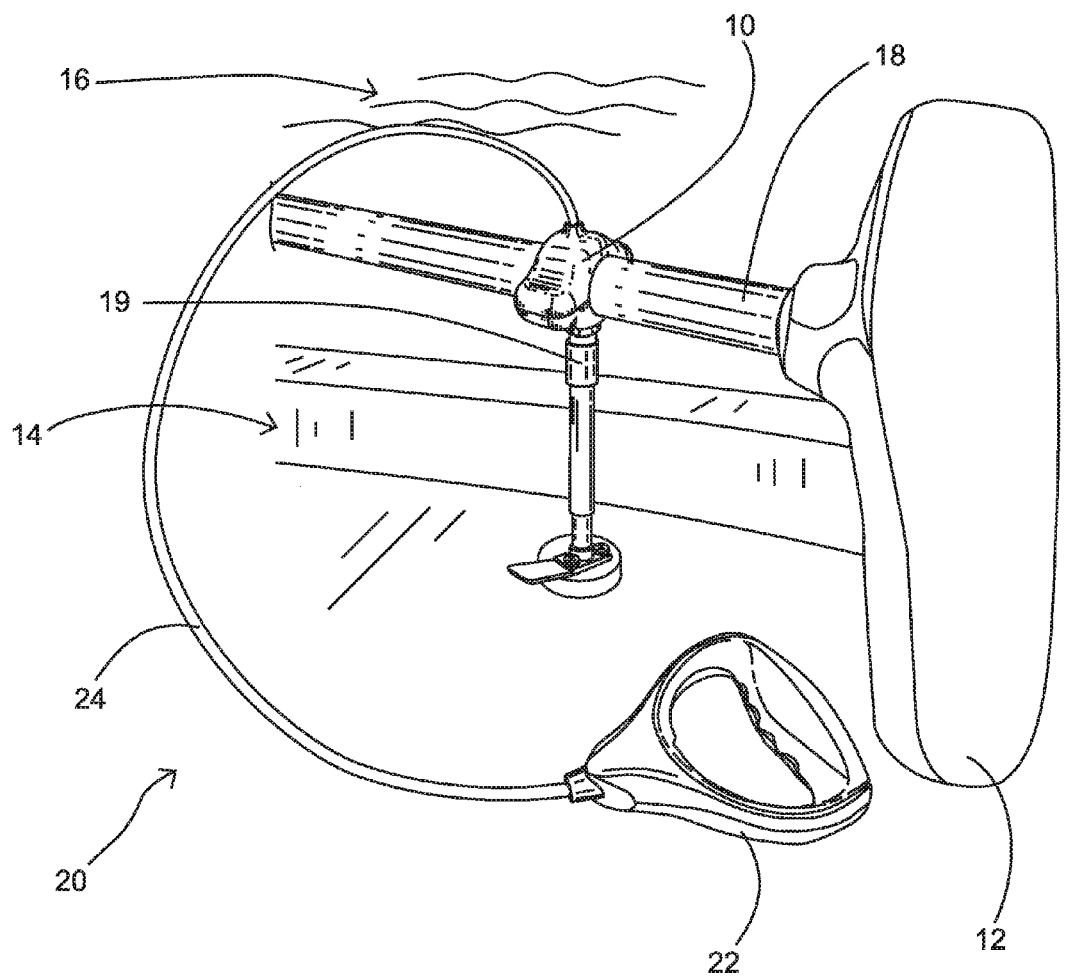
FIG. 1 is an embodiment of an attachment device made in accordance with the current disclosure and used with a trolling motor, trolling motor lift cable handle, and trolling motor lift cable.
Figure 2:
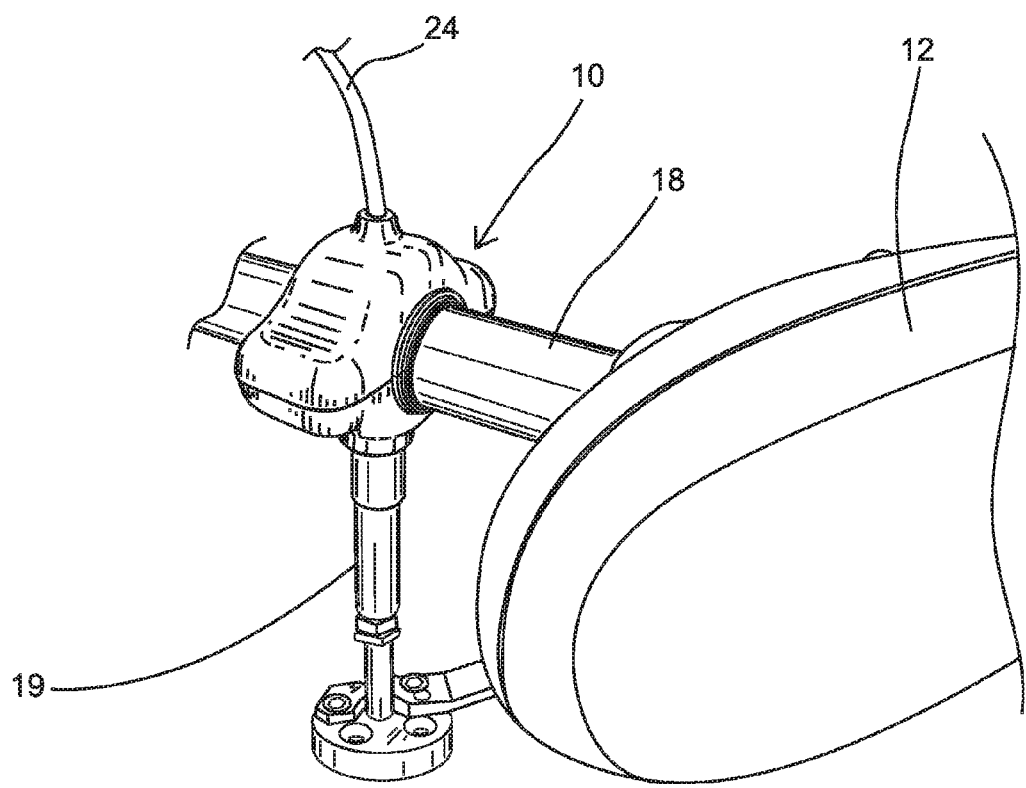
FIG. 2 is a perspective view of an attachment device made in accordance with the current disclosure showing the device attached to a support of a trolling motor.
Figure 3:
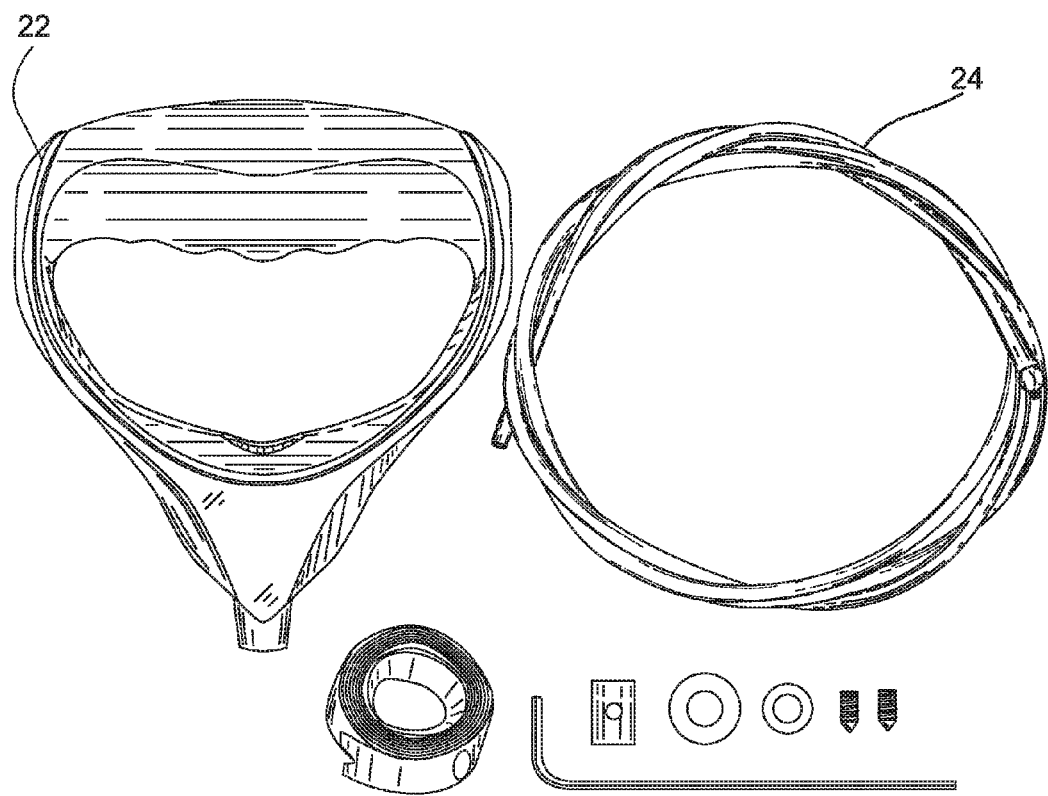
FIG. 3 is an example of a trolling motor lift cable and trolling motor lift cable handle along with installment accessories for the same as used with an attachment device of the current disclosure.
Figure 4:
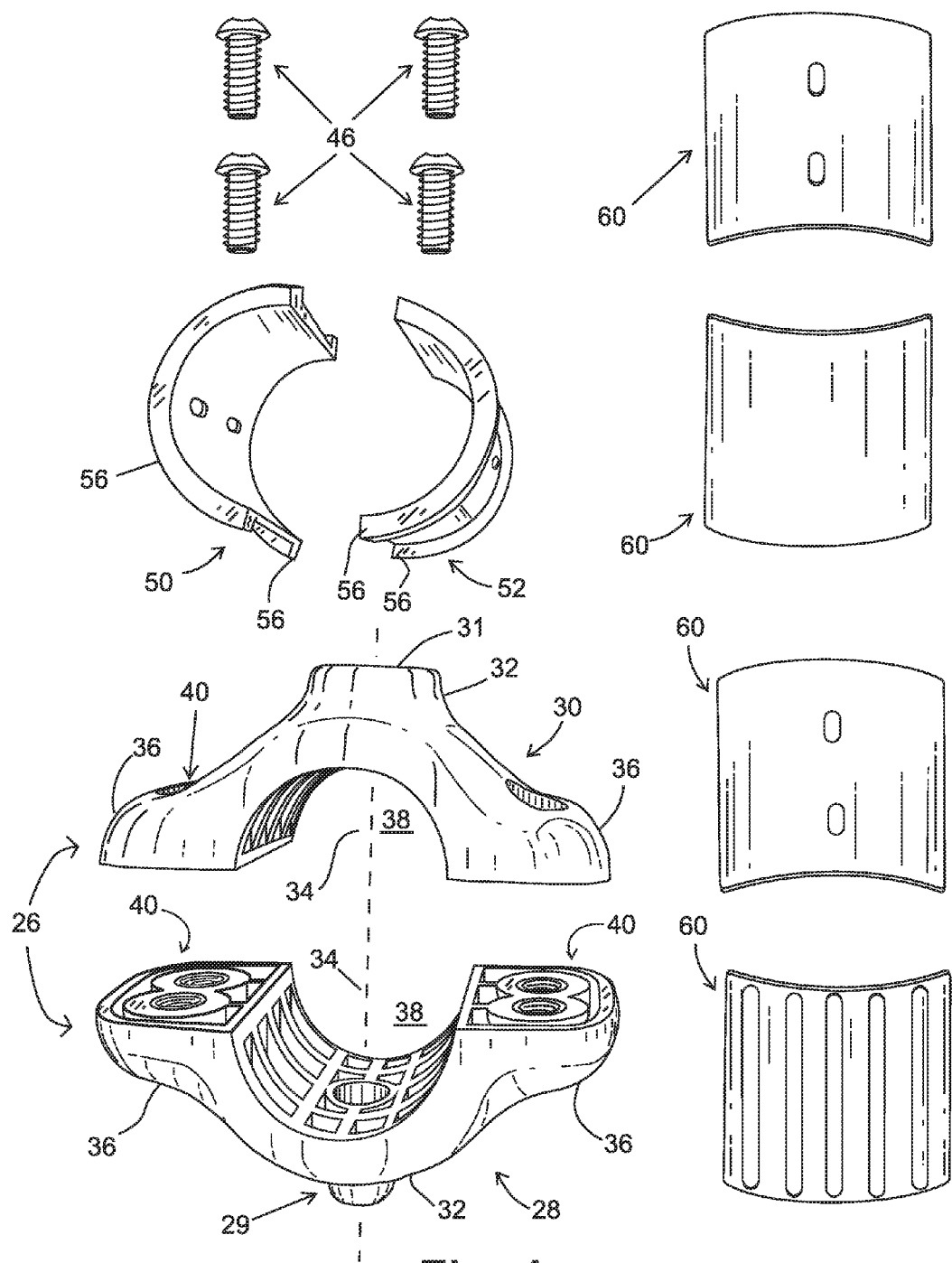
FIG. 4 is a perspective view of the elements of one embodiment of an attachment device made in accordance with the current disclosure.
Figure 5:
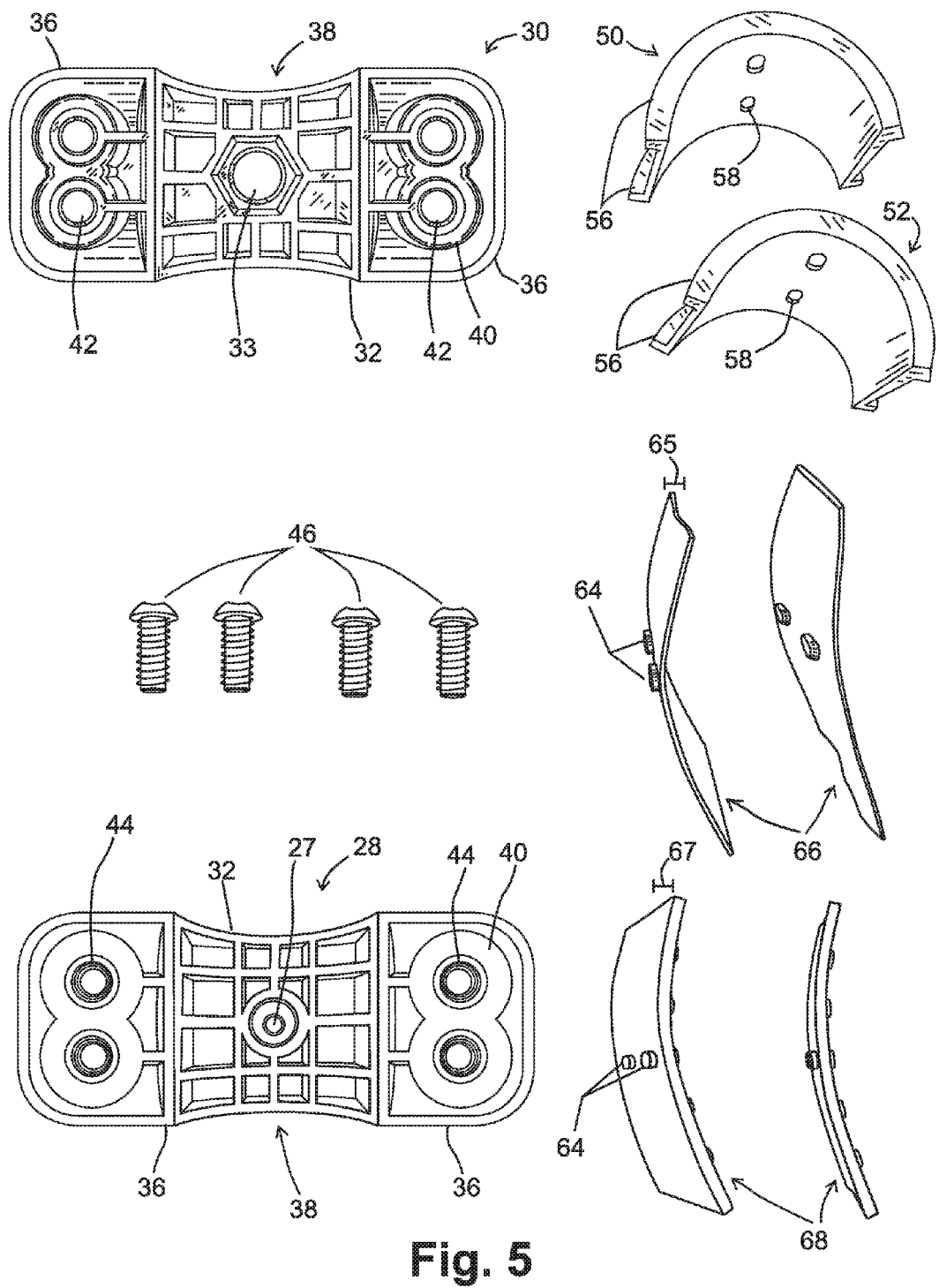
FIG. 5 is a perspective view similar to FIG. 4.
Figure 6:
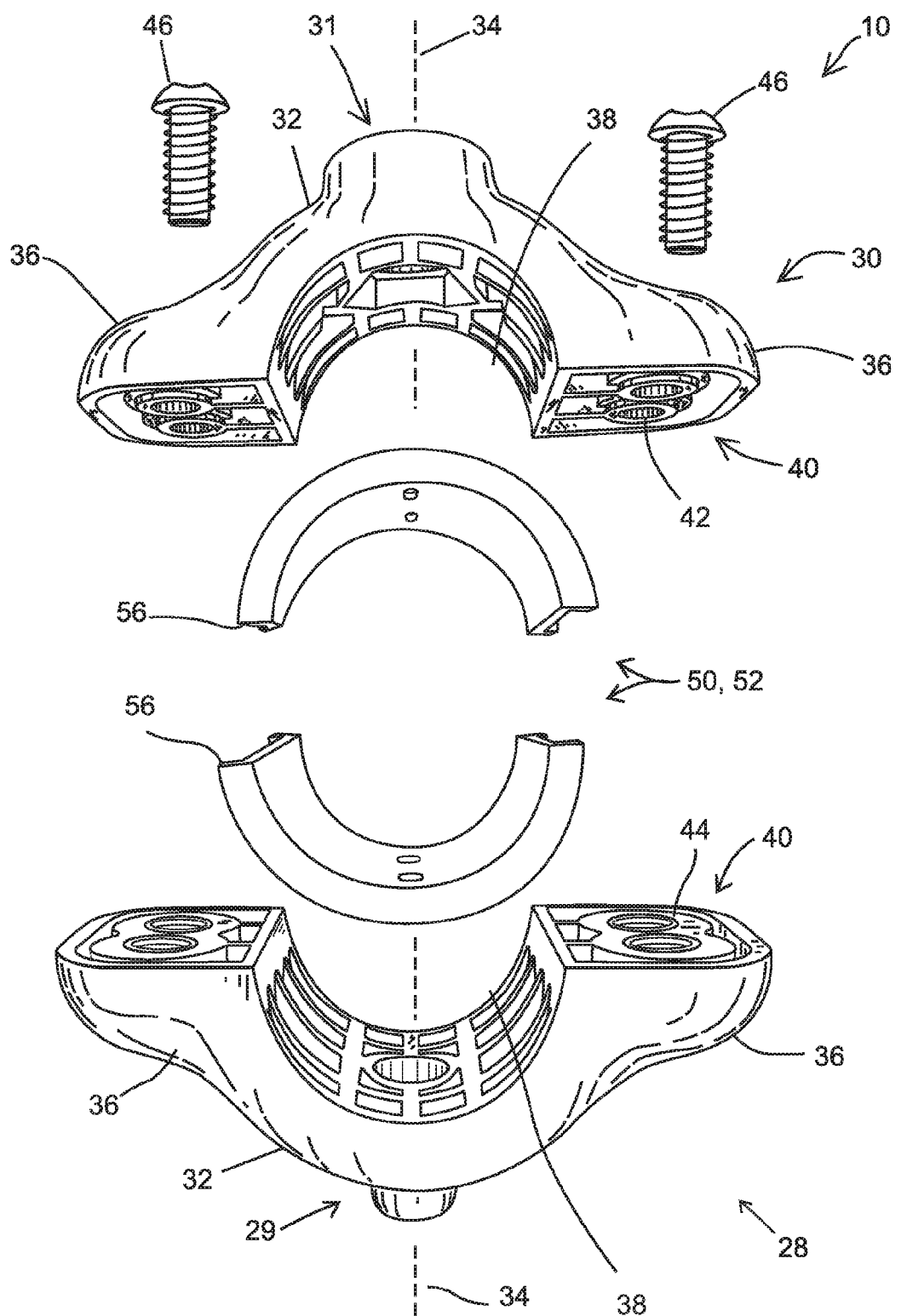
FIG. 6 is an expanded view of a portion of one embodiment of an attachment device made in accordance to the current disclosure.
Figure 7:
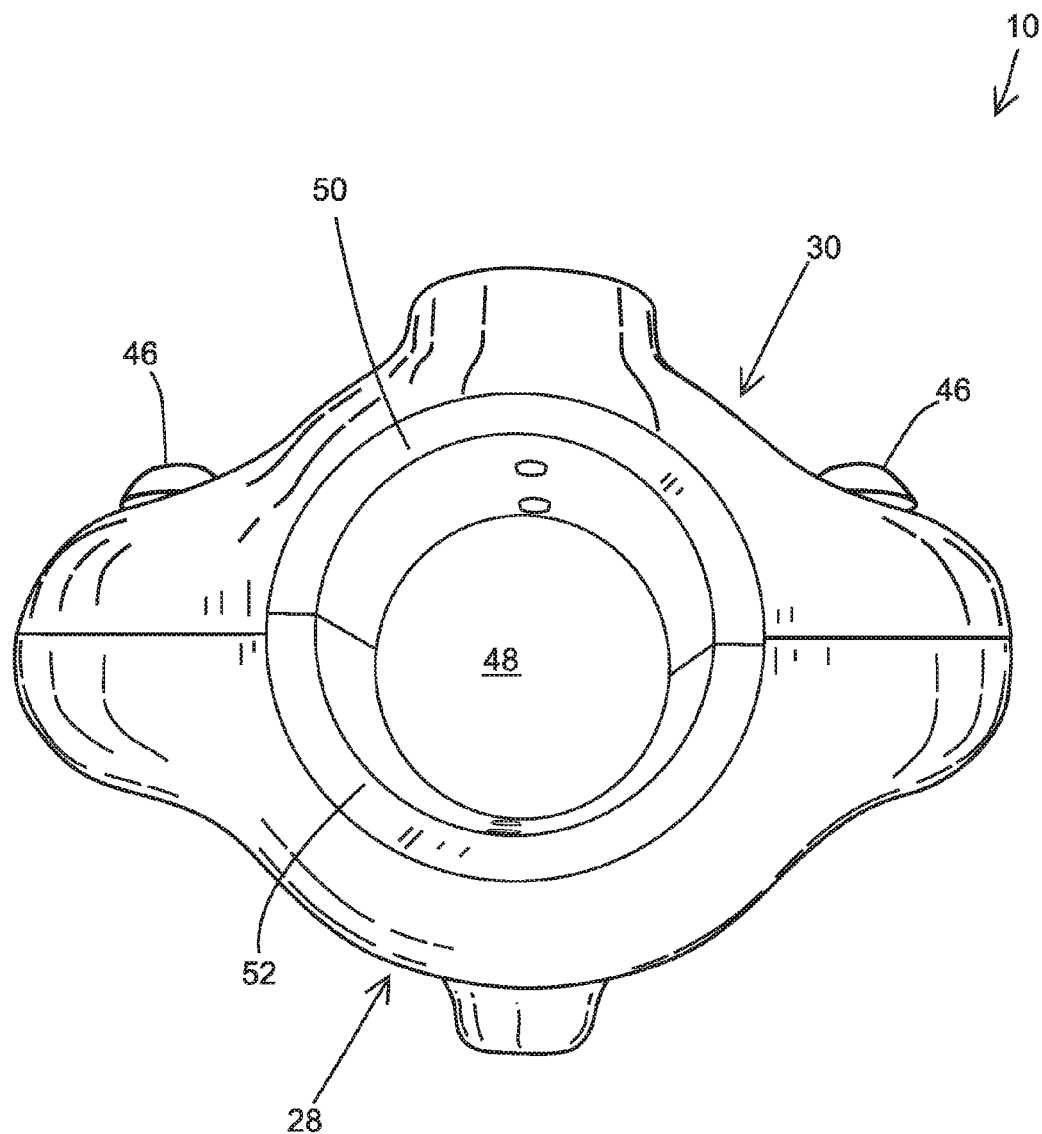
FIG. 7 is the collapsed view of the elements shown in FIG. 6.
Figure 8:
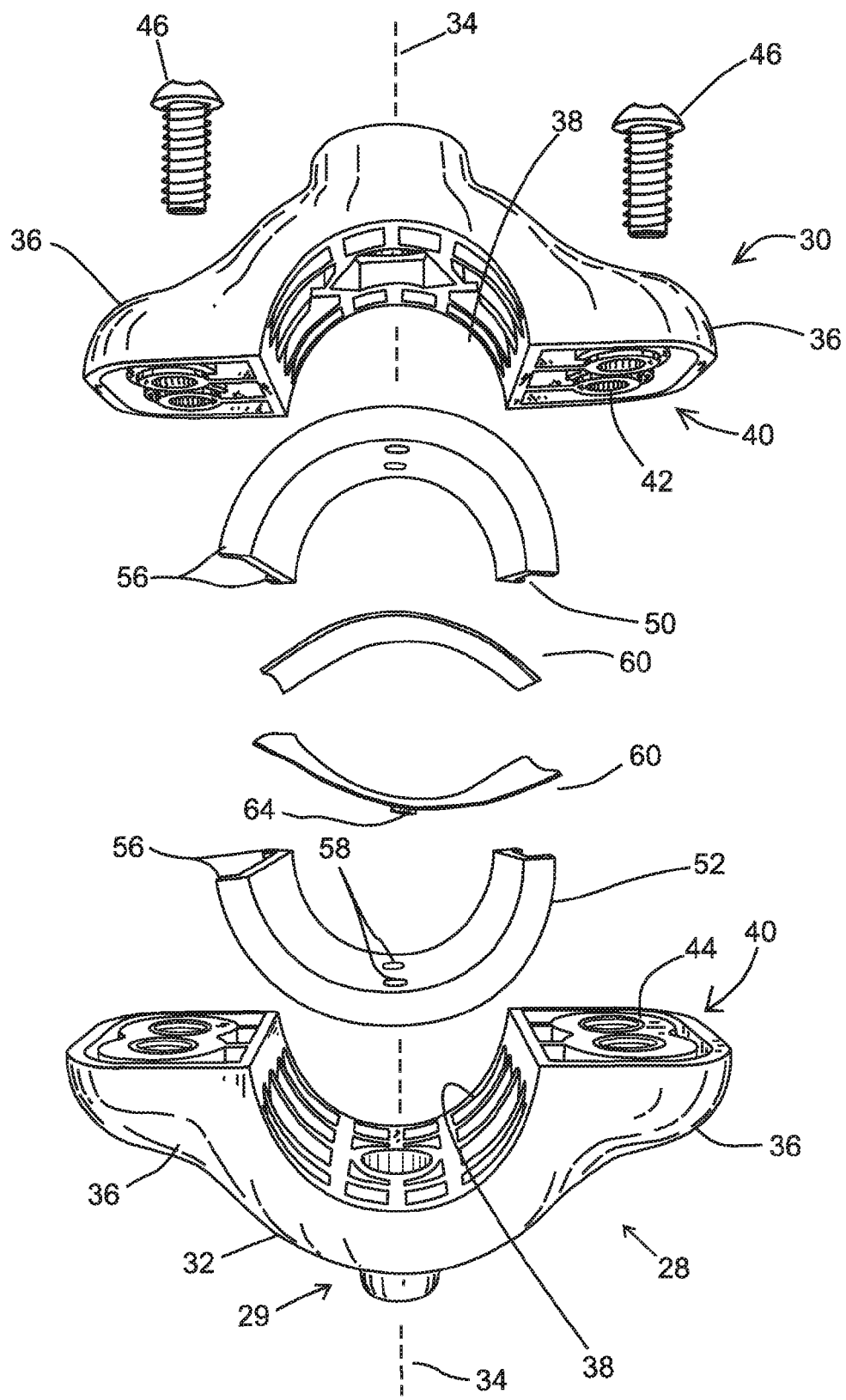
FIG. 8 is an expanded view of one embodiment of an attachment device and some of the elements made in accordance with the current disclosure.
Figure 9:
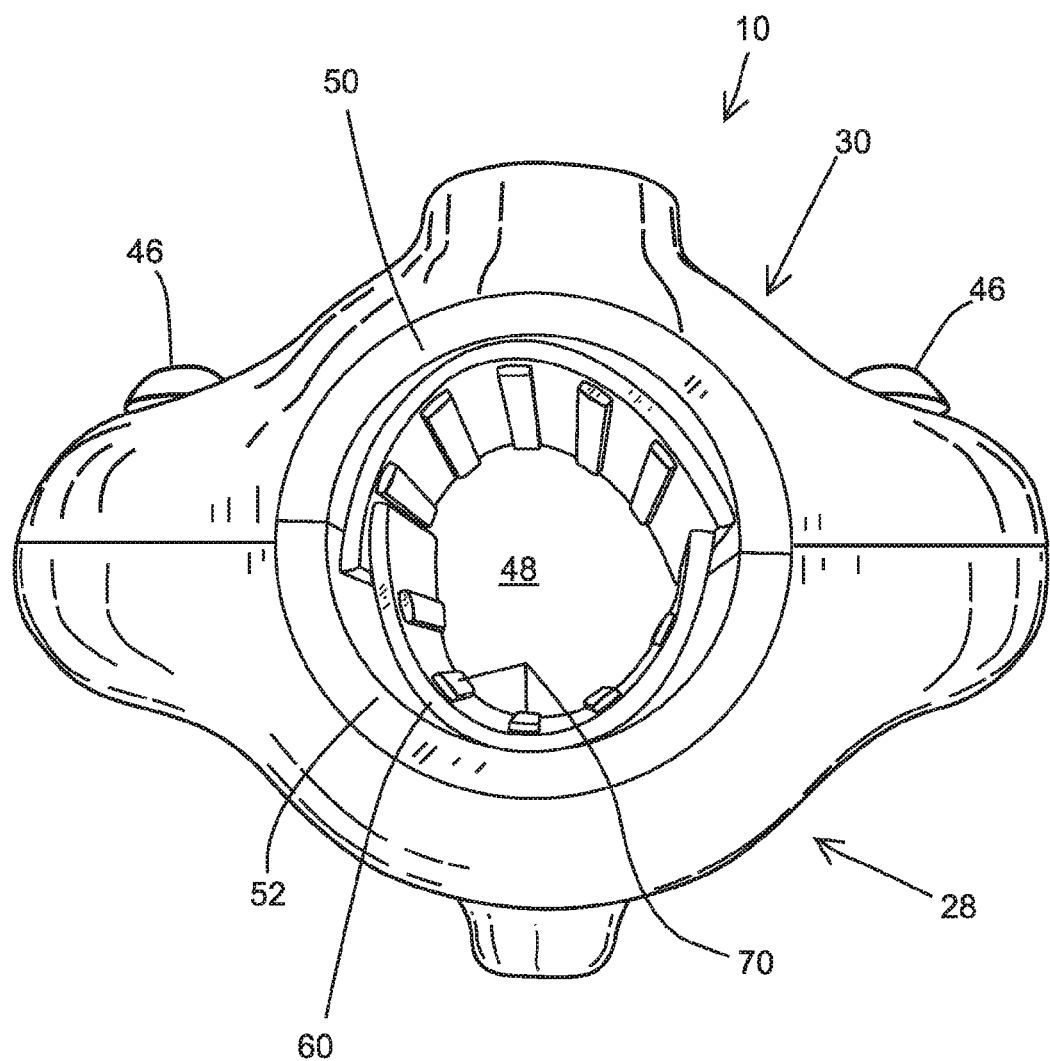
FIG. 9 is a collapsed view of FIG. 8.
Figure 10:
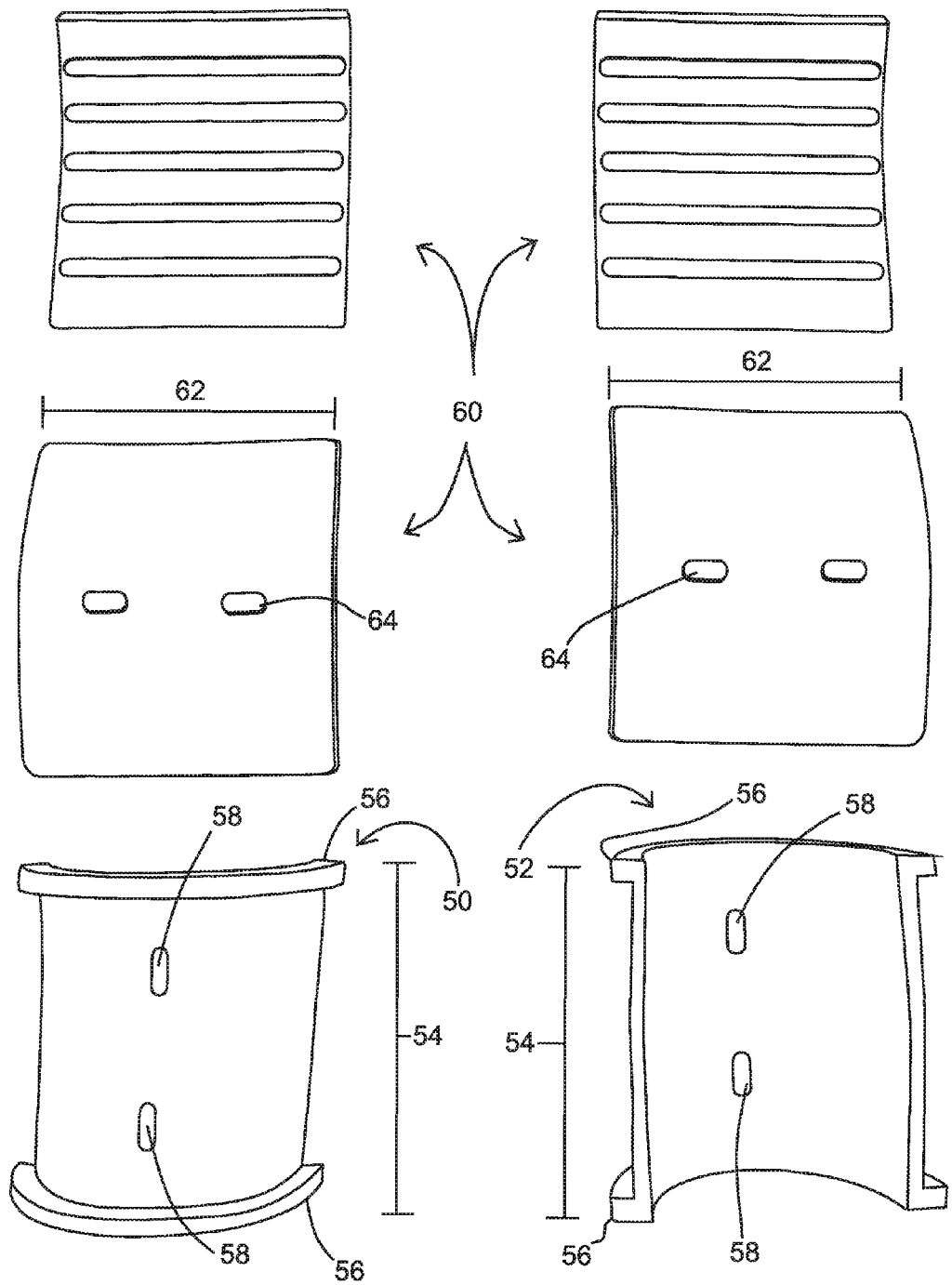
FIG. 10 is a view of some of the gaskets used with one embodiment of an attachment device in accordance with the current disclosure.
Figure 11:
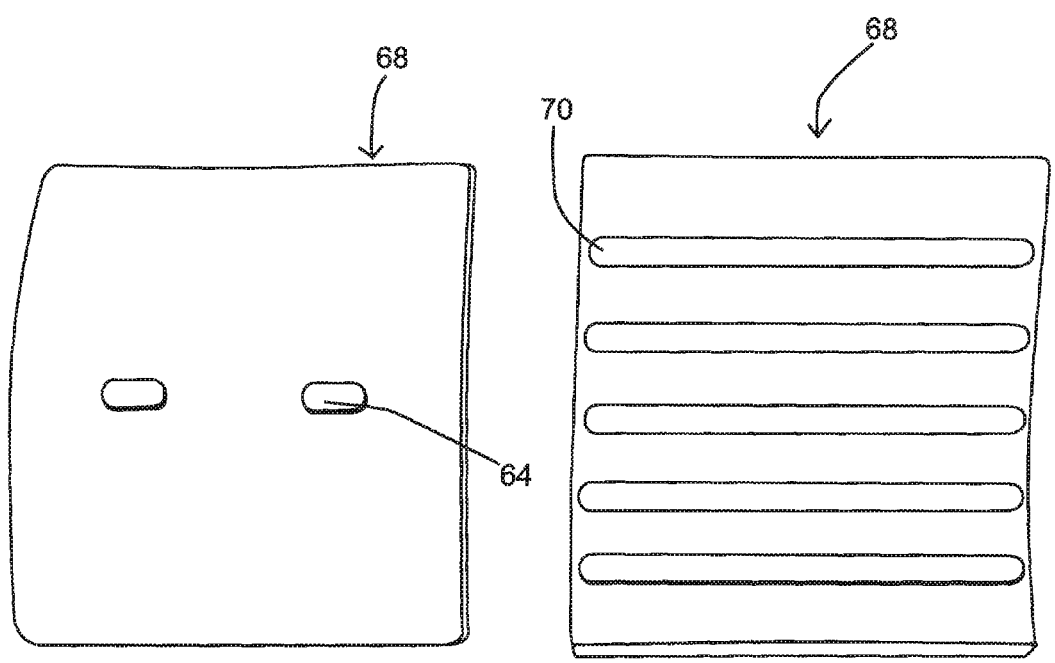
FIG. 11 is a detail view of some of the gaskets shown in FIG. 10.

Referring now to FIGS. 1-11, one embodiment of the present disclosure provides a trolling motor lift cord attachment device 10 that is generally designated by the numeral 10. It is understood that, for the sake of clarity, not all reference numbers are included in each drawing. In addition, positional terms such as a "upper," "lower," "side," "top," "bottom," "vertical," "horizontal," etc., refer to the apparatus when in the orientation shown in the drawing. The skilled artisan will recognize that objects in accordance with the present disclosure can assume different orientations when in use.

Referring now to FIG. 1, the attachment device 10 is preferably used with a trolling motor 12 that is used to move a boat 14 over water 16. The trolling motor 12 includes a support 18 (also referred to as a "shaft") used to connect the drive mechanism of the trolling motor 12 to the blades, or fins, that propel the boat 14 through the water 16. The attachment device 10 can be part of a trolling motor lift cord kit 20 used to facilitate control and movement of the trolling motor 12 when moved from a lowered position to a raised position in relation to the boat 14 and water 16. The kit 20 can include a handle 22 and cable 24 (or traditional cord) attached to the handle 22, as known in the art. Most references described herein refer to use of the preferred cable in connection with the attachment device, but it should be recognized that a traditional lift cord can also be used. The end of the cable 24 opposite handle 22 can connect to the attachment device 10, which in turn can attach to the support 18 of the trolling motor 12. This connection facilitates movement of the trolling motor 12 as acted upon by the handle 22, throughout the cable 24, attachment device 10, and support 18.

In a preferred embodiment, the attachment device 10, which can also described as a clamping system 10, can include several elements. For example, the attachment device 10 can include a clamping bracket 26 having a first clamp section 28 and a second clamp section 30. Each clamp section 28, 30 can have a center section 32, a center axes 34 passing through the center section 32, at least two arm portions 36 extending from the center section 32, and a concave engagement area 38 formed by the center section 32 and the arm portions 36. The clamp sections 28 and 30 can be comprised of materials known in the art to provide rigidity and strength and be corrosion resistant. For example a high density molded plastic, reinforced aluminum, titanium, stainless steel, and the like can be used. In a preferred embodiment the clamp sections 28 and 30 are composed of high density molded plastic.

Each arm portion 36 can include a fastening area 40 that is position to align with a fastening area 40 on an arm portion 36 on another arm portion 36. This alignment can occur when the center axes 34 of the first clamp section 28 and second clamp section 30 are aligned. The fastening area 40 can be those known in art including rotational pin connections, opening and threaded seat connections, mechanical friction fastening areas, and alike. In a preferred embodiment, the arm portions 36 on one of the clamps sections 28 or 30 includes at least one aperture 42 extending through the arm portion 36 while the fastening area 40 on the arm portion 36 of the other clamp section 28 or 30 includes threaded seats 44, or a threaded opening 44. In this embodiment, fasteners 46 can pass through the apertures 42 and engage the threaded openings 44 to secure the arm portions 36 and ultimately the clamp sections 28 and 30. In other embodiments, the fasteners 46 can be other mechanical fasteners known in the art.

The concave engagement area 38 of each clamp section 28 and 30 can be shaped to form an orifice 48 shaped to substantially surround the support 18 of the trolling motor 12 when the center axis 34 of the first clamp section 28 is aligned with the center axis 34 of the second clamp section 30. When the fasteners 46 are secured through the aperture 42 and threaded opening 44, the first and second clamp sections 28 and 30 can be secured around the support 18 of the trolling motor 12. In this fashion, the attachment device 10 is secured to support 18. In this embodiment, when the handle 22, through the cable 24, is secured to attachment device 10, a user can manipulate movement of the trolling motor 12, accordingly.

In a preferred embodiment, the first clamp section 28 includes a cable connection location 29 shaped to secure the cable 24 to the clamping bracket 26. This cable connection location 29 can include an opening 27 sized to accept the cable 24 (or traditional cord) or a tie down location on the first clamp section 28. The second clamp section 30 can include a stanchion connection location 31 shaped to secure a stanchion 19 that is used to support the support 18 of the trolling motor 12. The stanchion connection location 31 can include an opening 33 sized to either secure or accept the stanchion 19.

The attachment device 10 can further include a first base gasket 50 and a second base gasket 52 wherein each base gasket 50 and 52 is shaped to removeably engage and substantially follow the shape of one of the concave engagement areas 38. Each base gasket 50 and 52 is shaped to reduce the size of the orifice 48 formed between the concave engagement areas 38. Each base gasket 50 and 52 can be comprised of materials that reduce the likelihood of rotational movement of the attachment device 10 with respect to the support 18. In a preferred embodiment, the base gasket 50 and 52 are flexible and composed of rubberized material.

In an embodiment, each base gasket can further include a length 54 and a collar 56 at both ends of the length 54. The collar 56 can also be described as an extension or radial expansion of the base gasket 50 or 52. At least one opening 58, and preferably a plurality of openings 58, can be spaced along the length 54 of the base gasket 50 or 52. The base gasket 52 can be shaped to fit within the concave engagement area 38 such that the collars 56 extend outside the concave engagement area 38 and extend around a portion of the concave engagement area 38. The collar 56 facilitates the positioning of the base gasket 50 or 52 in the concave engagement area 38.

The attachment device 10 can also further include a plurality of spacers 60, wherein each spacer 60 is positioned to engaged and fit against one of the base gaskets 50 or 52. The spacers 60 are further shaped to reduce the size of the orifice 48 formed between the concave engagement area 38. The spacers 60 can include a length 62 that is approximately equal to the length 54 of one of the base gaskets 50 or 52. The spacer 60 can further include protrusions 64 that are positioned and shaped to engage the openings 58 of the base gaskets 50 or 52. This removeably secures the spacer 60 to the base gasket 50 or 52. The spacers 60 can be comprised of materials that reduce the likelihood of rotational movement of the attachment device 10 with respect to the support 18. In a preferred embodiment, the spacers are flexible and composed of rubberized material.

In an embodiment, the spacer 60 include a first spacer 66 having a first thickness 65 and a second spacer 68 having a second thickness 67 wherein the second thickness 67 is greater than the first thickness 65. The spacers 60 can further include a plurality of friction members 70 positioned to increase the coefficient of friction for that spacer 60 and further facilitate attachment of the attachment device 10 to the support 18 and reduce the likelihood of rotational movement of the attachment device 10 with respect to the support 18. Preferably the friction member 70 are positioned on the second spacer 68. The spacer(s) 60 may also include a recess or openings designed to allow and engage protrusions 64 to allow the spacer(s) 60 to be flush when multiple spacers are used.

In operation, the attachment device 10 can facilitate the attachment to multiple supports 18 through its combination of elements. The first and second clamps sections 28 and 30 can be secured around a support 18 that fits within the orifice 48. If a support 18 is smaller than the orifice 48, the base gaskets 50 and 52 can be positioned against the concave engagement areas 38 to reduce the size of the orifice 48 and engage support 18. If the support 18 is even smaller, one or more of the spacers 60 can be used to further reduce the effective orifice size 48 and secure the attachment device 10 to support 18. The various thicknesses of first spacer 66 and second spacer 68 can allow for variations in the size of the support 18. Additionally, the friction members 70 can further facilitate engagement to the support 18.

In an embodiment disclosed herein, a trolling motor lift cord kit can include the cable 24, handle 22, and clamping system 10. Various other tools and attachment devices used to secure the cable 24 within the handle 22, the cable 24 within the attachment device 10 can also be included in the kit 20. This kit 20 can be described as including the elements shown in FIG. 3 and FIG. 4. The cable 24 and handle 22 can be as described in U.S. Pat. No. 9,127,707, incorporated herein by reference in its entirety. In use with the disclosed clamping system 10, rather than attachment to the trolling motor locking mechanism disclosed in U.S. Pat. No. 9,127,707, the attachment is made through the opening 27 and secured on the underside of clamp section 28.

Thus, it is seen that the apparatus and methods disclosed herein achieve the ends and advantages previously mentioned. Numerous changes in the arrangement and construction of the parts and steps will be readily apparent to those skilled in the art, and are encompassed within the scope and spirit of the present disclosure.

What is claimed is:

1. A trolling motor lift cord attachment device for attaching a trolling motor lift cable to a support of a trolling motor, the device comprising:
   a clamping bracket having a first clamp section and a second clamp section, wherein:
   each of said first and second clamp section having a center section, a center axis passing through the center section, at least two armatures arm portions extending from the center section, and a concave engagement area formed by the center section and the at least two arm portions;
   each of said at least two arm portions of said first clamp section includes a fastening area positioned to align with one of the a fastening area on each of said at least two arm portions of said second clamp section; and
   the concave engagement area of each of said first and second clamp section is
   shaped to form an orifice shaped to substantially surround the support of the trolling motor when the center axis of the first clamp section is aligned with the center axis of the second clamp section;
   first and second fasteners, each of said first and second fasteners shaped to engage one of the fastening areas on said at least two arm portions of said first clamp section and said second clamp section to secure said first clamp section and said second clamp section together;
   first and second base gaskets, each of said first and second base gaskets shaped to removably engage and substantially follow a shape of one of the concave engagement areas, each of said first and second base gaskets shaped to reduce a size of the orifice formed between the concave engagement areas and wherein each of said first and second base gaskets further include a collar, each of said collar shaped to extend around at least a portion of the concave engagement area of one of the first and second clamp sections, and wherein each of said first and second base gaskets include an opening positioned between said collars; and
   first and a second spacers, each of said first and second spacers shaped to engage and fit against one of the first and second base gaskets and to reduce the size of the orifice formed between the concave engagement areas, and each of said first and second spacers further include a protrusion positioned and shaped to engage said openings in said first and second base gaskets to removably secure said first or second spacer to said first or second base gasket and wherein the second spacer has a greater thickness than the first spacer;
   wherein said first and second base gaskets and said first and second spacers are flexible and comprises rubberized material.

2. The device of claim 1, wherein:
   the first clamp section includes a cable connection location shaped to secure the trolling motor lift cable to the clamping bracket; and
   the second clamp section includes a stanchion connection location shaped to secure a stanchion used to support the trolling motor.

3. The device of claim 1, wherein at least one of the first spacer and second spacer includes a plurality of friction members positioned to increase a coefficient of friction.

4. A device for attaching a trolling motor lift cable to a support of a trolling motor, the device comprising:
   a clamping bracket having a first clamp section and a second clamp section, wherein:
   each of said first and second clamp section having a center section, a center axis
   passing through the center section, at least two arm portions extending from the center section, and a concave engagement area formed by the center section and the at least two arm portions;
   each of said at least two arm portions of said first clamp section includes a fastening area positioned to align with a fastening area on each of said at least two arm portions of said second clamp section when the center axes of the first and second clamp sections are aligned;
   the concave engagement area of each of said first and second clamp section is shaped to form an orifice shaped to substantially surround the support of the trolling motor when the center axes of the first and second clamp sections are aligned;
   the first clamp section includes a cable connection location shaped to secure the trolling motor lift cable to the clamping bracket; and
   first and second fasteners, each of said first and second fasteners shaped to engage one of the fastening areas on said at least two arm portions of said first clamp section and second clamp section to secure said first clamp section and said second clamp section together;
   first and second base gaskets, each of said first and second base gaskets shaped to removably engage and substantially follow a shape of one of the concave engagement areas, each of said first and second base gaskets shaped to reduce a size of the orifice formed between the concave engagement areas and wherein each of said base gasket further includes a length and a collar at both ends of the length, each of said collar shaped to extend around at least a portion of the concave engagement area of one of the clamp sections, and wherein each of said base gasket includes a plurality of openings positioned along the length;

first and a second spacers, each of said first and second spacers shaped to engage and fit against one of the first and second base gaskets and to reduce the size of the orifice formed between the concave engagement areas, and each of said first and second spacers further include a protrusion positioned and shaped to engage said openings in said first and second base gaskets to removably secure said first or second spacer to said first or second base gasket and wherein the second spacer has a greater thickness than the first spacer;

wherein said first and second base gaskets and said first and second spacers are flexible and comprises rubberized material.

5. The device of claim 4, wherein at least one of the first spacer and second spacer includes a plurality of friction member positioned to increase a coefficient of friction.

6. A trolling motor lift cord kit, the kit comprising:
a trolling motor lift cable;
a trolling motor lift handle attachable to the trolling motor lift cable;
a clamping system, the clamping system including:
  a clamping bracket having a first clamp section and a second clamp section, wherein:
    each of said first and second clamp section having a center section, a center axis passing through the center section, at least two arm portions extending from the center section, and a concave engagement area formed by the center section and the at least two arm portions;
  each of said at least two arm portion of said first clamp section includes a fastening area positioned to align with a fastening area on each of said at least two arm portions of said second clamp section when the center axes of the first and second clamp sections are aligned;
  the concave engagement area of each of said first and second clamp section is shaped to form an orifice shaped to substantially surround a support of a trolling motor when the center axes of the first and second clamp sections are aligned; and the first clamp section includes a cable connection location shaped to secure the trolling motor lift cable to the clamping bracket;
first and second fasteners, each of said first and second fasteners shaped to engage one of the fastening areas on said at least two arm portions of said first clamp section and second clamp section to secure said first clamp section and second clamp section together;
first and second base gaskets, each of said first and second base gasket shaped to removably engage and substantially follow a shape of one of the concave engagement areas, each of said first and second base gaskets shaped to reduce a size of the orifice formed between the concave engagement areas and wherein each of said base gasket further includes a length and a collar at both ends of the length, each of said collar shaped to extend around at least a portion of the concave engagement area of one of the clamp sections, and wherein each of said base gasket includes a plurality of openings positioned along the length;
a plurality of spacers, each of said spacer shaped to engage and fit against one of the base gaskets and to reduce the size of the orifice formed between the concave engagement areas, and each of said spacer further includes a plurality of protrusions positioned and shaped to engage one of the openings to removably secure the spacer to the base gasket and wherein the plurality of spacers includes a first spacer having a first thickness and second spacer having a second thickness greater than the first thickness.

7. The kit of claim 6, wherein at least one of the first spacer and second spacer includes a plurality of friction member positioned to increase a coefficient of friction.

8. The kit of claim 6, wherein the second clamp section includes a stanchion connection location shaped to secure a stanchion used to support the trolling motor.

* * * * *